Dec. 31, 1968

M. D. BRANE 3,419,786

ELECTRICAL CONVERTER APPARATUS FOR RECTIFYING
AND ADDING A PLURALITY OF A.C. VOLTAGES

Filed Dec. 27, 1966

WITNESSES:

Bernard R. Gregory

Leroy M. Garman

INVENTOR
Maxwell D. Brane
BY
Donald R. Lackey
ATTORNEY

United States Patent Office 3,419,786
Patented Dec. 31, 1968

3,419,786
ELECTRICAL CONVERTER APPARATUS FOR RECTIFYING AND ADDING A PLURALITY OF A.C. VOLTAGES
Maxwell D. Brane, Wexford, Pa., assignor to Westinghouse Electric Corporation, Pittsburgh, Pa., a corporation of Pennsylvania
Filed Dec. 27, 1966, Ser. No. 604,969
6 Claims. (Cl. 321—27)

ABSTRACT OF THE DISCLOSURE

This invention relates to static electrical converter apparatus of the type in which two or more single-phase, in-phase alternating current voltages are full-wave rectified and serially added. The converter includes but two leg portions, regardless of the number of voltages to be rectified, and requires only one more power diode in each leg of the converter than the number of voltages to be rectified. The rectified voltages are serially added by connecting each of the alternating current voltages to the two legs of the bridge converter such that the insantaneous polarities of the input terminals are the same at alternate terminals across each leg of the converter.

---

The relatively low maximum voltage and current ratings on semiconductor devices, such as silicon power diodes and silicon controlled rectifiers, while being increased as the state-of-the-art advances, still requires that many devices be connected in series and parallel circuit relation to obtain the voltage and current ratings, respectively, necessary on many industrial applications. For example, direct current traction motors, used on the vehicles of transit systems, are often fed from a transformer having a plurality of secondary windings, with each secondary winding being connected to a single-phase, full-wave bridge rectifier circuit. The output terminals of the bridge rectifier circuits are connected in series circuit relation to obtain the direct current voltage magnitude desired. In order to smooth the rectified voltage being applied to the traction motors, an iron core choke, reactor or inductor is connected in series circuit relation with the motors. When one or more of the secondary windings are disconnected from the bridge rectifier circuits, which occurs during various control operations, the stored energy in the inductor "free-wheels" through the various power diodes of the serially connected bridge rectifier circuits which are not connected to a secondary winding. The division of this free-wheeling current into substantially equal portions through each leg of the bridge rectifier circuit is a difficult problem, compounded by the fact that dividing the current substantially equally through the leg portions of one bridge circuit has no affect on the remaining bridge circuits, as the current in the legs of each bridge rectifier circuit reaches a common point before being connected to the next bridge circuit. Also, the energizing of one or more bridge circuits from their associated secondary windings has no affect on the current distribution in the leg portions of the bridge circuits which are disconnected from their associated secondary windings.

Further, each full-wave, single-phase bridge circuit requires a minimum of four power diodes, thus requiring a minimum of 8 power diodes when the power transformer has two secondary windings, each feeding a bridge rectifier circuit; a minimum of 12 power diodes when the transformer has three secondary windings, each feeding a full wave, single-phase bridge rectifier circuit, etc. It would be desirable to reduce the number of power diodes required when two or more secondary windings of a transformer are each connected to a full-wave, single-phase bridge rectifier circuit, as this would reduce both the losses and cost of the apparatus. It would be especially desirable if the reduction in the maximum number of power diodes could be accomplished while also improving the distribution of the free-wheeling current through the power diodes.

Accordingly, it is an object of the invention to provide new and improved electrical converter apparatus.

Another object of the invention is to provide new and improved electrical converter apparatus of the type which rectifies a plurality of alternating current voltages and adds the rectified voltages to obtain the desired direct current magnitude.

Still another object of the invention is to reduce the maximum number of power diodes required in an elecrical converter of the type which rectifies two or more alternating current potentials, and adds the rectified voltages to obtain the desired value.

A further object of the invention is to reduce the maximum number of power diodes required in an electrical converter of the type which rectifies and adds two or more alternating potentials, and to improve the distribution of free-wheeling current through the power diodes of the converter.

Briefly, the present invention accomplishes the above cited objects by providing an electrical converter which includes means for providing at least two alternating current potentials, and a new and improved bridge rectifier circuit which has only two leg portions connected between positive and negative output terminals, regardless of the number of alternating potentials to be rectified. Each leg portion of the bridge circuit has a plurality of serially connected power diodes, with the minimum number of diodes required being one more than the number of alternating potentials to be rectified. The junctions between the serially connected power diodes from alternating current input terminals for the various alternating potentials, with each alternating potential being connected to a like location in each leg portion of the bridge rectifier circuit. In order to add the rectified voltages of the various alternating potentials, the alternating potentials are connected to the leg portions of the bridge circuit such that the instantaneous polarities are similar at alternate terminals across each leg portion. Thus, taking a transformer with three secondary windings as an example, in the prior art three full-wave, single-phase bridge rectifier circuits would be required, which would establish the minimum number of power diodes at 12. A similar electrical converter constructed according to the teachings of the invention, would require a minimum of 8 power diodes. Further, since only two leg portions are required in the bridge rectifier circuit constructed according to the teachings of the invention, the free-wheeling current is required to be divided only once, and when at least one secondary winding is connected to the bridge circuit, the free-wheeling current will be influenced by the polarity of the connected secondary winding, automatically pulsing the free-wheeling current between each of the leg portions of the bridge circuit upon each change in the polarity of the alternating current potential.

Further objects and advantages of the invention will become apparent from the following detailed description, taken in connection with the accompanying drawings, in which.

Figure 1:
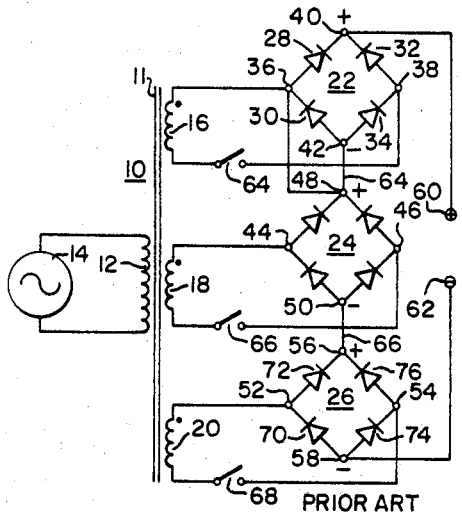
FIGURE 1 is a schematic diagram which illustrates typical prior art electrical converter apparatus.

Broadly, the invention applies to electrical converter apparatus which rectifies two or more single-phase, in-phase voltages, and adds the rectified voltages to provide the desired direct current potential. In the prior art, as illustrated in FIG. 1, this is commonly accomplished by utilizing a transformer 10 having a magnetic core 11, a primary winding 12 connected to a source 14 of alternating potential, and a plurality of secondary windings, such as windings 16, 18 and 20. The secondary windings 16, 18 and 20 are connected to single-phase, full-wave, bridge rectifier circuits 22, 24 and 26 respectively. Bridge rectifier circuit 22 includes at least four power diodes 28, 30, 32 and 34, alternating current input terminals 36 and 38, and positive and negative direct current output terminals 40 and 42, respectively. Bridge rectifier circuits 24 and 26 are similar to bridge rectifier circuit 22, with bridge rectifier circuit 24 having alternating current input terminals 44 and 46 and positive and negative direct current output terminals 48 and 50, respectively, and bridge rectifier circuit 26 having alternating current input terminals 52 and 54, and positive and negative direct current output terminals 56 and 58, respectively. Thus, secondary winding 16 is connected to input terminals 36 and 38 of bridge rectifier circuit 22, secondary winding 18 is connected to input terminals 44 and 46 of bridge rectifier circuit 24, and secondary winding 20 is connected to input terminals 52 and 54 of bridge rectifier circuit 26. The secondary windings 16, 18 and 20 may be connected to the input terminals without regard to the instantaneous polarities of the alternating potential. In order to obtain the necessary high voltage direct current potential, the bridge rectifier circuits 22, 24 and 26 are serially connected, with positive terminal 40 of bridge rectifier circuit 22 being connected to output terminal 60, and negative terminal 42 being connected to positive terminal 48 of bridge rectifier circuit 24 via conductor 64. The negative terminal 50 of bridge rectifier circuit 24 is connected to positive terminal 56 of bridge rectifier circuit 26 via conductor 66, and negative terminal 58 of bridge rectifier circuit 26 is connected to negative output terminal 62. Thus, in this example, which uses three sources of alternating potential supplied by the three secondary windings of transformer 10, three separate full-wave, single-phase bridge rectifier circuits are required, which requires a minimum total of 12 power diodes. Arrangements such as that shown in FIG. 1 are used to obtain adjustable direct current voltages of greater magnitude than the available voltage ratings of semiconductor devices, such as silicon power diodes. The adjustable voltage is obtained by operating switching means 64, 66 and 68 associated with secondary windings 16, 18 and 20, respectively.

In each of the bridge rectifier circuits, such as rectifier circuit 22, each rectifier device, such as device 34, represents at least one device in series between the two adjacent bridge terminals, and one or more devices connected in parallel. The current which enters each of the four branches of the bridge rectifier may be divided between any parallel connected devices in the branch by balancing reactors (not shown), which are well known in the art. It is difficult, however, to obtain an equal division of current in each rectifier leg connected between the negative and positive terminals of the rectifier circuit when the bridge rectifier circuit is not connected to its associated secondary winding. In this instance, the current free-wheels through the bridge rectifier. For example, assuming that bridge rectifier circuit 26 is not connected to secondary winding 20, the current will flow into terminal 58 and divide, with a portion of the current going through the leg which includes power diodes 70 and 72, and the remainder flowing through the leg which includes power diodes 74 and 76. Obtaining an equal distribution of current between the two legs is difficult to achieve because of the different impedances of the two leg portions. Then, the current in the two legs joins at terminal 56, flows to terminal 50, and the same current distribution problem is encountered, if rectifier circuit 24 is not connected to its associated secondary winding 18. Bridge rectifier circuit 22 will also have a current division problem when it is not connected to its associated secondary winding 16. Further, the division of current between the legs of the bridge rectifier circuits which are not connected to their associated windings, is not affected by the bridge rectifier circuits which are connected to their associated windings.

The present invention improves the current distribution among the various power diodes and accomplishes this result with a structure which requires fewer power diodes than comparable prior art arrangements.

Figure 2:
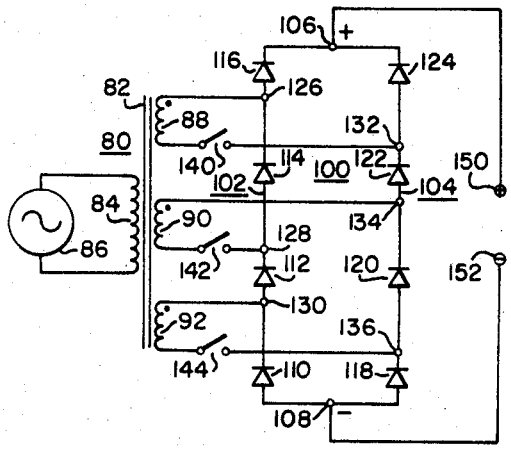
FIG. 2 is a schematic diagram which illustrates electrical converter apparatus constructed according to the teachings of the invention.

For example, FIG. 2 is a schematic diagram of an electrical converter constructed according to the teachings of the invention, which, like the arrangement of FIG. 1, utilizes a transformer 80, having a magnetic core 82, a primary winding 84 connected to a source 86 of alternating potential, and secondary windings 88, 90 and 92. Instead of utilizing a separate single-phase, full-wave, bridge rectifier circuit for each secondary winding however, a new and improved bridge arrangement 100 is utilized which requires fewer power diodes than the prior art arrangement, has lower losses than the prior art arrangement, and facilitates more equal division of free-wheeling current through the power diodes of the bridge circuit when one or more of the secondary windings are not connected to the bridge circuit.

More specifically, bridge circuit 100 includes two leg portions 102 and 104 connected between positive and negative output terminals 106 and 108, respectively. Each leg portion 102 and 104 includes a minimum number of serially connected power diodes, with the minimum number being the number of secondary winding plus one. Since, in this instance, there are three secondary windings, each leg portion will have a minimum of four power diodes, with leg portion 102 having serially connected power diodes 110, 112, 114 and 116, and leg portion 104 having serially connected power diodes 118, 120 122 and 124. The reason for requiring one more power diode in each leg portion than the number of secondary windings, is to provide an alternating current input terminal between each adjacent pair of serially connected power diodes in each leg portion of the bridge rectifier circuit. Thus, in leg portion 102, alternating current input terminal 126 is formed between diodes 116 and 114, alternating current input terminal 128 is formed between diodes 114 and 112, and alternating current input terminal 130 is formed between diodes 112 and 110. In leg portion 104, alternating current input terminal 132 is formed between diodes 124 and 122, alternating current input terminal 134 is formed between diodes 122 and 120, and alternating current input terminal 136 is formed between diodes 120 and 118.

The ends of secondary windings 88, 90 and 92 are connected to terminals in each leg portion which occupy similar positions in the leg portions. In other words, if one end of secondary winding 88 is connected between the first pair of diodes in leg portion 102, adjacent the positive terminal 106, the other end of secondary winding 88 would be connected between the first pair of diodes in leg portion 104, which are also adjacent the positive terminal 106.

In the prior art arrangement shown in FIG. 1, the secondary windings may be connected to the input terminals on their associated bridge rectifiers without regard to the instantaneous polarities of secondary windings. In the bridge circuit 100 shown in FIG. 2, the polarities of the secondary windings are important, and care must be taken to connect the secondary windings to the input terminals such that like instantaneous polarities will appear at alternate input terminals in each leg portion. Assuming that the dotted end of windings 88, 90 and 92 indicate instantaneous positive polarity, the first secondary winding to be connected to the bridge circuit 100 may be connected to the input terminals without regard to polarity. Once one secondary winding is connected to bridge circuit 100, however, the polarities of the remaining alternating current input terminals are determined. If the dotted end of secondary winding 88 is connected to input terminal 126 of leg portion 102, as shown in FIG. 2, then the next successive alternating current input terminal 128 must be connected to the undotted end of secondary winding 90. The next successive input terminal 130 is then connected to the dotted end of secondary winding 92. Thus, when terminal 126 of leg portion 102, is positive, terminal 128 will be negative, and terminal 130 will be positive. When terminal 132 of leg portion 104 is negative, terminal 134 will be positive, and terminal 136 will be negative. The polarity of the secondary windings and their connection to the bridge circuit is thus critical, and the hereinbefore described arrangement must be followed for any number of secondary windings, in order to add the rectified output voltages of the secondary windings. If all of the dotted ends of the secondary windings, for example, were to be connected to the same leg portion, the rectified voltages would be connected in parallel, instead of in series. With the polarities of the secondary windings connected as taught by the invention, the voltages of the windings add. Starting at negative terminal 108 of bridge circuit 100 and proceeding through rectifier 118 to the instantaneous negative terminal 136, the voltage of secondary winding 92 is picked up by proceeding through winding 92 to terminal 130. From terminal 130, the series circuit continues through rectifier 112 to terminal 128, and the voltage of secondary winding 90 is added by proceeding through secondary winding 90 to terminal 134. From terminal 134, the series circuit continues through rectifier 122 to terminal 132, and the voltage of winding 88 is added by proceeding through secondary winding 88 to terminal 126, and to the positive output terminal 106. When the polarities of the secondary windings reverse, the series circuit will proceed from negative terminal 108, through rectifier 110, through secondary winding 92 to terminal 136, through rectifier 120 to terminal 134, through secondary winding 90 to terminal 128, through rectifier 114 to terminal 126, through secondary winding 88 to terminal 132, and through rectifier 124 to positive output terminal 106.

Thus, the minimum number of rectifier devices or power diodes for a comparable electrical converter, has been reduced from 12 to 8 by the teachings of the invention. Although the power diodes required by bridge circuit 100 will require a higher voltage rating than the power diodes required by the prior art arrangement shown in FIG. 1, the losses in a power diode are substantially the same regardless of its voltage rating. Therefore, the losses of bridge circuit 100 are substantially less than the losses of the bridge rectifier arrangement shown in FIG. 1. Also, the cost of the power diodes does not increase in proportion to the increase in voltage rating. Therefore, the 8 power diodes required by bridge arrangement 100 will cost less than the 12 power diodes required in the prior art arrangement of FIG. 1.

Another very important advantage which bridge circuit 100 possesses, is the division of free-wheeling current between the two leg portions of the rectifier circuit. Assume switching means 140 associated with secondary winding 88 is closed and switching means 142 and 144 are open. The current will be forced to flow through all of the power diodes according to the polarity of secondary winding 88. Thus, the average current in the two leg portions of bridge circuit 100 would be the same as if the current had divided equally between the two leg portions. When the dotted end of secondary winding 88 is positive, current will flow through diode 116, to positive terminal 106, to terminal 150 and through the load circuit (not shown), from terminal 152 to negative terminal 108, through diodes 118, 120 and 122 to terminal 132, and then through secondary winding 88. On the next ½ cycle, current will flow through secondary winding 88 to terminal 132, through diode 124 to positive terminal 106, through the load to negative terminal 108, through diodes 110, 112 and 114 to terminal 126, and through winding 88. Thus, one half cycle of the current flows through one leg portion, and the other current half cycle flows through the other leg portion. The current through each leg portion, and through any parallel connected diodes in the leg portion, may be divided between parallel connected diodes by conventional current balancing reactors.

As long as one secondary winding is connected to bridge circuit 100, the current will be directed through the entire bridge circuit according to the polarities of the connected windings. If all the secondary windings are disconnected from the bridge circuit, stored reactive current in the load and in any filtering devices, may free-wheel through bridge circuit 100. Since only two leg portions are involved in bridge circuit 100, the division of the current between the leg portions is easier to accomplish than when a plurality of conventional single-phase, full-wave bridge rectifier circuits are serially connected.

Figure 3:
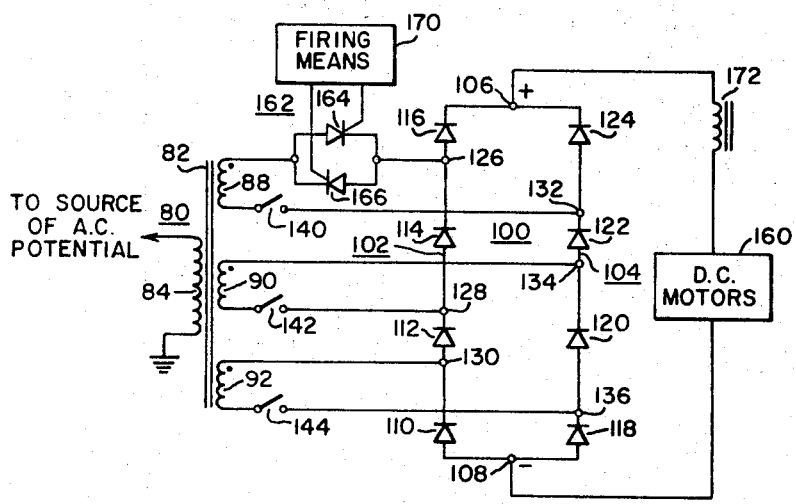
FIG. 3 is a schematic diagram illustrating an electrical converter constructed according to the teachings of the invention, applied to a transit system application.

FIG. 3 is a schematic diagram illustrating a practical embodiment of the arrangement shown in FIG. 2, with like reference numerals in FIGS. 2 and 3 indicating like components. More specifically, FIG. 3 is a schematic diagram of an adjustable voltage direct current converter for driving direct current motors 160, which are disposed to operate a transit vehicle, such as a high speed railroad type car. The multiple secondary winding arrangement shown in FIG. 2 is suited for this application, as the direct current motors 160 will usually require a voltage range which greatly exceeds the voltage capabilities of a single semiconductor rectifier device. Further, the multiple secondary windings allows the output voltage of the converter to be continuously varied from substantially zero to a maximum voltage equal to the sum of the rectified voltages of the secondary windings, by varying the voltage of only one secondary winding. The semiconductor devices utilized in the voltage adjusting means may be selected for the voltage of the single secondary winding, rather than for the maximum voltage, which provides a substantial savings in the cost of the apparatus and also increases its efficiency.

The voltage adjusting means 162, which in this instance is shown associated with secondary winding 88, may include parallel, back-to-back connected controlled rectifiers 164 and 166, with this parallel circuit being connected in series with secondary winding 88. Voltage adjusting means 162 also includes suitable firing means 170. Controlled rectifiers 164 and 166 may be silicon controlled rectifiers, and firing means 170 may be any conventional firing means which controls the firing or conduction angle of the controlled rectifiers in response to an operator's control, a computer, or any other controlling means. Transformer 80 may have one end of its primary winding adapted for connection to a trolley for obtaining a single-phase alternating potential, and its other end may be grounded.

In order to provide a substantially smooth direct current potential for the operation of direct current motors 160, a suitable iron core inductor or reactor 172 may be connected in series circuit relation with the output terminals of bridge circuit 100.

In the operation of the adjustable voltage electrical converter shown in FIG. 3, the direct current drive motors 160 are started by closing switching means 140 associated with secondary winding 88. At this point, the conduction angle would be zero, providing a zero voltage at input terminals 126 and 132. As the firing angle is advanced, the voltage applied to terminals 126 and 132 would be increased, until the maximum conduction angle is reached, and at which point the full voltage of secondary winding 88 will be applied to terminals 126 and 132. When the dotted end of secondary winding 88 is positive, current will flow from terminal 126 through diode 116 to positive terminal 106, through reactor 172, through direct current drive motors 160 to terminal 108, through diodes 118, 120 and 122 to terminal 132, and through secondary winding 88. When the dotted end of secondary winding 88 is negative, the current will flow from terminal 132 through diode 124 to positive terminal 106, through reactor 172 and direct current drive motors 160 to terminal 108, through diodes 110, 112, and 114, to terminal 126, and then through secondary winding 88. Thus, the average current through the two leg portions 102 and 104 will be substantially equal, even though secondary windings 90 and 92 are not connected to bridge circuit 100. When the conduction angle is maximum and still more voltage is required by direct current drive motors 160, switching means 142 associated with secondary winding 90 will be closed, and the conduction angle of firing means 170 will be simultaneously reduced to zero. The voltage on direct current motors 160 will remain substantially the same, since the rectified voltage output of secondary winding 90 is substantially the same as the rectified voltage output of secondary winding 88 at the maximum conduction angle of firing means 170. The voltage applied to direct current drive motors 160 may then be increased by advancing the firing angle of firing means 170, until the conduction angle again reaches a maximum. At this point switching means 144 may be closed while simultaneously reducing the conduction angle of firing means 170 to zero. The voltage applied to direct current drive motors 160 may again be increased beyond the sum of the connected secondary windings 90 and 92, by increasing the conduction angle of firing means 170.

In reducing the direct current voltage applied to drive motors 160, the conduction angle of firing means 170 would be reduced until reaching zero, at which point switching means 144 would be opened and the conduction angle of firing means 170 would be simultaneously increased to its maximum value. The conduction angle of firing means 170 would again be reduced until reaching zero, at which point switching means 142 would be opened while simultaneously increasing the conduction angle of firing means 170. The conduction angle for firing means 170 would again be reduced until the voltage applied to terminals 126 and 132 reaches zero. The sequencing of the switching means associated with the secondary windings, and the control of the conduction angle of the firing means 170 may be accomplished by the operators controller, computer, or any other controlling means, in a manner well known in the art.

In summary, there has been disclosed new and improved electrical converter apparatus of the type which rectifies and adds a plurality of alternating potentials, which requires a minimum number of power rectifiers or diodes, which reduces the losses and cost of the apparatus, and which divides free-wheeling current through the leg portions of the bridge rectifier arrangement in a substantially equal manner.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. Electrical converter apparatus comprising:
   first means providing at least first and second AC voltages to be rectified, each of said AC voltages having first and second output terminals having like instantaneous polarities, respectively,
   first and second DC output terminals,
   a bridge circuit having first and second leg portions, said first and second leg portions being connected between said first and second DC output terminals, with the only direct connection between said first and second leg portions being at said first and second DC output terminals, said first and second leg portions each having at least first, second and third serially connected rectifier devices, with the minimum number of rectifier devices in each leg portion being one more than the number of AC voltages to be rectified, each of said rectifier devices being poled to conduct current from the first DC output terminal to the second DC output terminal, the junctions between the first and second, and the second and third rectifier devices in each leg portion forming first and second AC input terminals, respectively,
   switching means connecting the first and second output terminals of said first AC voltage to the first AC input terminals of said first and second leg portions, respectively,
   and switching means connecting the first and second output terminals of said second AC voltage to the second AC input terminals of said second and first leg portions respectively,
   said bridge circuit rectifying and adding the AC voltages connected thereto, and directing current through said rectifier devices according to the instantaneous polarities of the connected AC voltages.

2. The electrical converter apparatus of claim 1 wherein said first means is an electrical transformer having at least first and second secondary windings, with the AC voltages to be rectified being provided by said secondary windings.

3. The electrical converter apparatus of claim 2 wherein at least one of the secondary windings includes means for adjusting the magnitude of its AC voltage, which, along with the switching means for connecting the AC voltages to the bridge circuit enables an adjustable DC output voltage to be provided which has a range from substantially zero to the sum of the maximum rectified potentials of the secondary windings.

4. Electrical converter apparatus comprising:
   first means providing a plurality of consecutively numbered AC voltages, each of said AC voltages having first and second output terminals having like instantaneous polarities, respectively,
   a bridge circuit having first and second leg portions connected between positive and negative DC output terminals, with the only direct connection between said first and second leg portions being at the positive and negative DC output terminals, said first and second leg portions each having a plurality of serially connected rectifier devices poled to conduct current from the negative to the positive DC output terminals, with the minimum number of serially connected devices in each leg portion being one more than the number of AC voltages provided by said first means, to provide a plurality of AC input terminals between adjacent pairs of rectifier devices in each leg portion which are consecutively numbered starting at the positive DC output terminal,
   and switching means for selectively connecting said consecutively numbered AC voltages to like numbered AC input terminals on said bridge circuit, with the relative positions of the first and second output terminals of each AC voltage being sequentially reversed across the first and second leg portions of said bridge circuit, said bridge circuit rectifying and adding the AC voltages connected thereto, and directing current through said rectifier devices according to the instantaneous polarities of the connected AC voltages.

5. The electrical converter apparatus of claim 4 wherein said first means is an electrical transformer having a plurality of secondary windings, and said plurality of AC voltages are provided by said plurality of secondary windings.

6. The electrical converter apparatus of claim 5 wherein at least one of the secondary windings has means for adjusting the magnitude of its AC voltage which, along with the switching means provides an adjustable DC voltage having a magnitude which has a range from substantially zero to the sum of the maximum rectified potentials of said secondary windings.

References Cited

UNITED STATES PATENTS

| | | | |
|---|---|---|---|
| 3,257,597 | 6/1966 | Weiser | 318—344 |
| 3,340,448 | 9/1967 | Thiessen | 321—27 X |

FOREIGN PATENTS

| | | |
|---|---|---|
| 477,389 | 1938 | Great Britain. |
| 1,295,099 | 4/1962 | France. |

JOHN F. COUCH, *Primary Examiner.*

G. GOLDBERG, *Assistant Examiner.*

U.S. Cl. X.R.

318—344, 414